United States Patent [19]

Freese et al.

[11] Patent Number: 5,148,472
[45] Date of Patent: Sep. 15, 1992

[54] CELLULAR TELEPHONE CALL ADMINISTRATION SYSTEM

[76] Inventors: David E. Freese, 35 Baroness La., Laguna Niguel, Calif. 92677; David A. Miller, 25652 Rimgate Dr. Apt. #13A, El Toro, Calif. 92630; Mark J. Nielsen, 6533 N. Campbell, Chicago, Ill. 60645

[21] Appl. No.: 622,508

[22] Filed: Dec. 5, 1990

[51] Int. Cl.⁵ ............................................. H04M 11/00
[52] U.S. Cl. ............................................. 379/59; 379/63
[58] Field of Search ........................ 379/59, 60, 63, 144

[56] References Cited

U.S. PATENT DOCUMENTS 4,777,646 10/1988 Harris .................................... 379/144
5,031,204 7/1991 McKernan ............................. 379/59

OTHER PUBLICATIONS

The Bell System Technical Journal, "Mobile Telephone Switching Office", by Chadha et al., pp. 71-95, Jan. 1979.

Motorola Technical Disclosure, "EMX Electronic Switching Equipment", Jan. 1984.

Primary Examiner—James L. Dwyer
Assistant Examiner—Dwayne D. Bost
Attorney, Agent, or Firm—John C. Albrecht

[57] ABSTRACT

A cellular telephone call administration system processes detailed call records from a cellular switch as the calls are processed. This arrangement expedites automatic, electronic distribution of detailed call records to resellers and service provider billing facilities and to the roam billing clearing house. The call administration system, without operator intervention, provides a metered billing class of service to customers as an aid to controlling their cellular communication expenses; and provides for registration of roam sets for service on a cellular switch without need for a billing agreement with the set's home carrier.

3 Claims, 4 Drawing Sheets

APPLICATION SOFTWARE

| | |
|---|---|
| FILE SERVER | — 401 |
| ADMINISTRATION MTCE. | — 402 |
| MESSAGE PROCESSOR | — 403 |
| MESSAGE RATING | — 404 |
| ADMINISTRATIVE PORT | — 405 |
| CUSTOMER INTERFACE | — 406 |
| CREDIT CARD AUTH. & BILLING | — 407 |
| RESELLER ROUTER | — 408 |
| ROAM MODULE | — 409 |
| MESSAGE ROUTER | — 410 |

DATA FILES

| | |
|---|---|
| CONTRACT RESELLER INVENTORY | — 501 |
| RENTAL RESELLER INVENTORY | — 502 |
| METERED BILLING INVENTORY | — 503 |
| EASY ROAMER INVENTORY | — 504 |
| CONTR. RESELLER CALL DETAIL | — 505 |
| RENTAL RESELLER CALL DETAIL | — 506 |
| METERED BILLING CALL DETAIL | — 507 |
| EASY ROAMER CALL DETAIL | — 508 |
| CONTRACT ROAMER CALL DETAIL | — 509 |
| ALL OTHER SETS SERVED | — 510 |

CELLULAR TELEPHONE CALL ADMINISTRATION SYSTEM

TECHNICAL FIELD

This invention relates to the immediate billing of cellular air time and long distance telephone charges.

BACKGROUND OF THE INVENTION

Cellular telephone service is widely available in major population centers through competing cellular carriers. The owner of each cellular "set" is a customer of a particular "home" cellular carrier and is assigned to a "home" switching area. Each cellular set has a unique manufacturer's identification number, Electronic Serial Number (ESN), which is employed in making calls. Additionally, the "home" cellular carrier assigns a telephone number in the national numbering plan to each set. A cellular set may "roam" beyond its "home" area; however, "roam" service to a set is generally provided by foreign carriers that have a working billing agreement with the set's home carrier. Certain carriers permit a roam set to be manually registered for credit card billing for service rendered by the carrier.

There are several unique aspects of cellular telephone service which are in stark contrast to land telephone service.

In land telephone service, there are dominant carriers with little or no overlap in the provision of basic switching services in any geographical area. In cellular telephone service there can be two or more cellular carriers serving the same geographical area.

In land telephone service, a carrier provides service to a fixed physical address, and a deposit may be required to assure the payment of monthly charges. However, in cellular service, although each cellular "set" has a unique manufacturer's identification number, it is extremely difficult for a carrier to get a good physical fix on customers who choose to avoid payment for services. Cellular sets can be moved throughout the country and registered with different cellular carriers. Many cellular customers maintain service over short periods of time and switch from carrier to carrier, often without paying for prior services. Such losses to carriers lead to higher charges for all customers.

Fraud and billing delays associated with "roam" cellular sets has created hardship for cellular carriers. Since each cellular carrier is responsible for long distance charges placed as a 1+ call, many cellular carriers, as a matter of operating policy, will not permit a roam set to place 1+ long distance call. This policy is dictated by fraud associated with many roam sets; and the long delay in processing and receiving payment for billing to a roam set customer. Although manual temporary registration of a roam set is available in some areas, the registration and billing processes are so cumbersome that there is little reason for a carrier to offer the option or for a customer to use the option.

Roam customers are frustrated by such limited available service while they are outside the service area of their home carrier; and by their inability to receive service in cities where no agreement exists with their home carrier.

As in land telephone systems, service resellers create operational challenges for a carrier. In cellular telephone systems, there are two general classes of service resellers who buy air time at bulk rates and charge their customers at a premium rate.

The first class of reseller, purchases a block of numbers from a carrier and assigns those numbers to sets owned by customers who buy service for substantial periods of time e.g., months or even years. A reseller sells service to such established customers and assumes the risk of loss associated with all calls processed by the customer. The reseller advises the carrier when to activate and deactivate a set in the cellular switch. Typically, the reseller sends a FAX message to the cellular carrier with orders to activate and/or deactivate numbers within the reseller's block of numbers. This class of reseller is generally billed monthly for all air and long distance services; and prompt payment is expected by the cellular carrier. With such infrequent billing, a reseller cannot take advantage of cyclic billing which spreads the billing activities and receipts through a month.

The second class of reseller, owns sets which are leased to a customer for short periods of time e.g., daily or weekly. When a set is rented, the reseller requests that the set be activated in the switch; and when the set is returned the reseller requests deactivation of the set. In this type of reseller service, there is a need for "immediate billing" at the time that a set is returned. Since a reseller, generally, does not have immediate access to detailed call records, such as those that are available at a PBX of a hotel in a land telephone system, the reseller has no way of rating calls, for either air time or long distance service.

In land telephone systems, a company can easily control its telephone expenses through various call screening and billing features which are available in PBX and other business telephone systems.

However, employees who have company provided cellular sets tend to ignore the relatively high cost of cellular air time and, thus, incur large monthly bills. Because of their inability to control expenses, many companies severely limit the number of cellular sets that they place in service. From the viewpoint of both the carriers and the companies who buy cellular services, there is a definite need for services which help a company contain their cellular communication expenses.

DISCLOSURE OF THE INVENTION

In accordance with our invention, our call administration system continuously monitors all records of calls processed by a related cellular switch as the calls are processed; classifies all call records into a plurality of different service classes and divisions within those classes; rates the calls for at least certain service classes; records the call records with corresponding service class and division identifiers; distributes call records appropriate to each service class; and provides services to customers of certain service classes in accordance with the call records.

The following are examples of services classes which are supported by our call administration system:
Roam sets served by contract with home carriers;
Resellers for service to sets not owned by the reseller;
Resellers with rental sets owned by the reseller;
Metered billing with established credit;
Roam sets served without home carrier contract;
All other sets served by the cellular system.

Advantageously, the services provided by our implementation of the above noted service classes improve billing performance for the cellular carrier; and provide improved and new services to reseller and roam customers.

Advantageously, our administration system provides immediate "rating" of air time charges and long distance charges for call records of certain of the above classes; and the charges calculated by the rating process are stored in memory along with the call detail records.

In the case of billing to roam sets which are served by a contract with a set's home carrier, our system, on a near real-time basis, provides roam call files in industry standard "CIBER" format which are automatically sent daily directly to a roam clearing house electronically. This in contrast to present industry practice to transfer roam call data to a "Billing Service Provider" by tape storage which is moved by courier. After the roam calls are processed, the billing service provider sends the roam call data in CIBER format to one of two national clearing houses.

Metered billing is an example of a new service which can help individuals and companies contain the cost of their cellular calling activities. In accordance with an aspect of our invention, certain cellular sets are assigned to a metered billing class of service; credit to an amount selected by a customer is established for each cellular set of the class through a variety of billing arrangements and commercial agencies; and a set with approved credit is activated for use at the cellular switch. The calling activities of the sets of the metered billing class are continuously monitored; air time and long distance charges are immediately calculated for each call; and the charges for a call are charged against the established credit amount to arrive at a remaining credit balance. When the remaining credit balance for a set reaches a defined lower limit, the next call from that set is diverted to a recorded announcement which provides instructions for interactively establishing further credit without the need for an operator. If new credit arrangements are not made and remaining credit is exhausted, the set is deactivated at the cellular switch and further service is denied until credit is again established. These arrangements permit companies and individuals to control their cellular telephone expenses to established limits.

In accordance with our invention, we provide an improved service for roam customers in foreign switch areas not served by roam agreements with their home carrier. When a roam customer attempts to place a call through a cellular switch which includes our call administration system, the call proceeds if the roam set is covered by a contract between its home carrier and the local carrier. However, if the set is not covered by an inter-carrier agreement, the attempted call is diverted to an interactive voice terminal within our system. The voice terminal, without operator intervention, presents an opportunity for the roam customer to secure payment for roam calls through the local switch through an approved national credit card. This transaction is conducted by voice from the voice terminal and by DTMF signals from the cellular set.

With these arrangements, a carrier can provide service to a "roaming" cellular set without the need for an agreement with the set's "home" carrier; and the carrier can be assured of payment for both air time and 1+ long distance charges. The cellular carrier automatically submits charges to the credit card company electronically without the complexity and loss of time incurred in current roam call billing practices.

In the case of service to resellers who rent sets owned by the reseller, our call administration system maintains complete up-to-date call records in the reseller's facility. Accordingly, a reseller can provide complete detailed billing information at the time that a customer returns a set. Additionally, our system includes provision for a reseller to electronically activate and deactivate their sets in the cellular switch without cumbersome FAX messages and the concomitant delays in processing requests.

DETAILED DESCRIPTION

Figure 1:
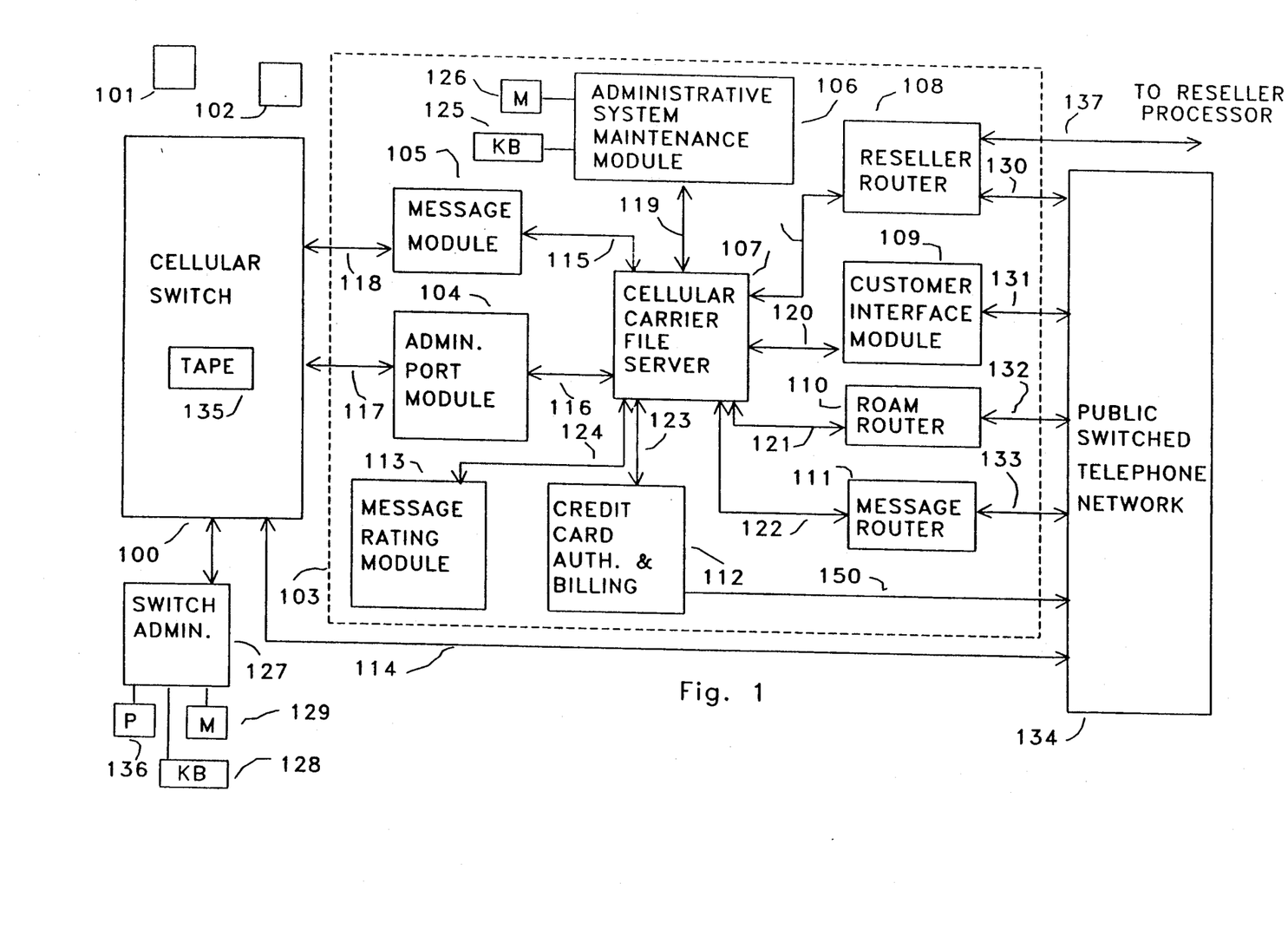
FIG. 1 is a block diagram of cellular switching system with our call administration system.

A block diagram of an illustrative cellular telephone system which includes an illustrative embodiment of our call administration system 103 is shown in FIG. 1.

PRIOR ART

In FIG. 1, the cellular switch 100 serves a plurality of cellular sets e.g., 101, 102. For purposes of illustration, the cellular switch 100 may be a Motorola EMX-2500 cellular switch. The cellular switch 100 employs a switch administration processor 127 which includes a keyboard 128, a monitor 129 and a printer 136. The cellular carrier employs processor 127 to activate and deactivate cellular sets, set system operating parameters, perform system maintenance, and obtain system reports.

The cellular switch 100 serves customers to complete calls between cellular sets and between cellular sets and land stations. The path 114 of FIG. 1 represents trunk circuits between the cellular switch 100 and the public switched network (PSTN) 134. Both originating and terminating calls between a cellular set served by switch 100 and stations reached by means of the public switched network 134 are handled over trunks 114.

Internal to the switch 100, there is a call record tape system 135 with removable tapes. As calls are processed by switch 100, records of the calls are stored on a disk memory (not shown). On demand by an operator, the call data records can be transferred to the removable tape of tape system 135. It is common practice to transfer "raw call data" records daily. The raw call data records stored on the tape contain information which is required to bill customers for both cellular air time and long distance charges. There is no industry standard which defines the exact makeup of a raw call data record. Accordingly, such records are switch dependent and the details may vary from switch to switch and may be different for different switch manufacturers. In any event, the call records contain sufficient information to provide detailed billing to the customers; and an entity which generates bills has full knowledge of the makeup of the call records.

According to the literature, at least one cellular carrier provides daily, limited electronic transfer of detailed call records to a reseller for rental sets owned by the reseller. It is understood that a summary record for the current 24 hour period of set activity is available to the reseller by inquiry to permit completion of a set check-in transaction. The detail call records in that system are available at the next periodic distribution of call data.

While this arrangement is superior to distribution of call data by courier; it is limited to rental resellers and falls short of a complete billing service.

Because of the fragmentation of cellular telephone switching among many switch proprietors, the presence of different types of resellers, and the problems of roam sets, billing for cellular service has been complex, expensive and quite inefficient. A major problem of cellular billing is the long time delay between the time that a service is rendered and the time that billing is presented to a customer and payment is received.

Figure 2:
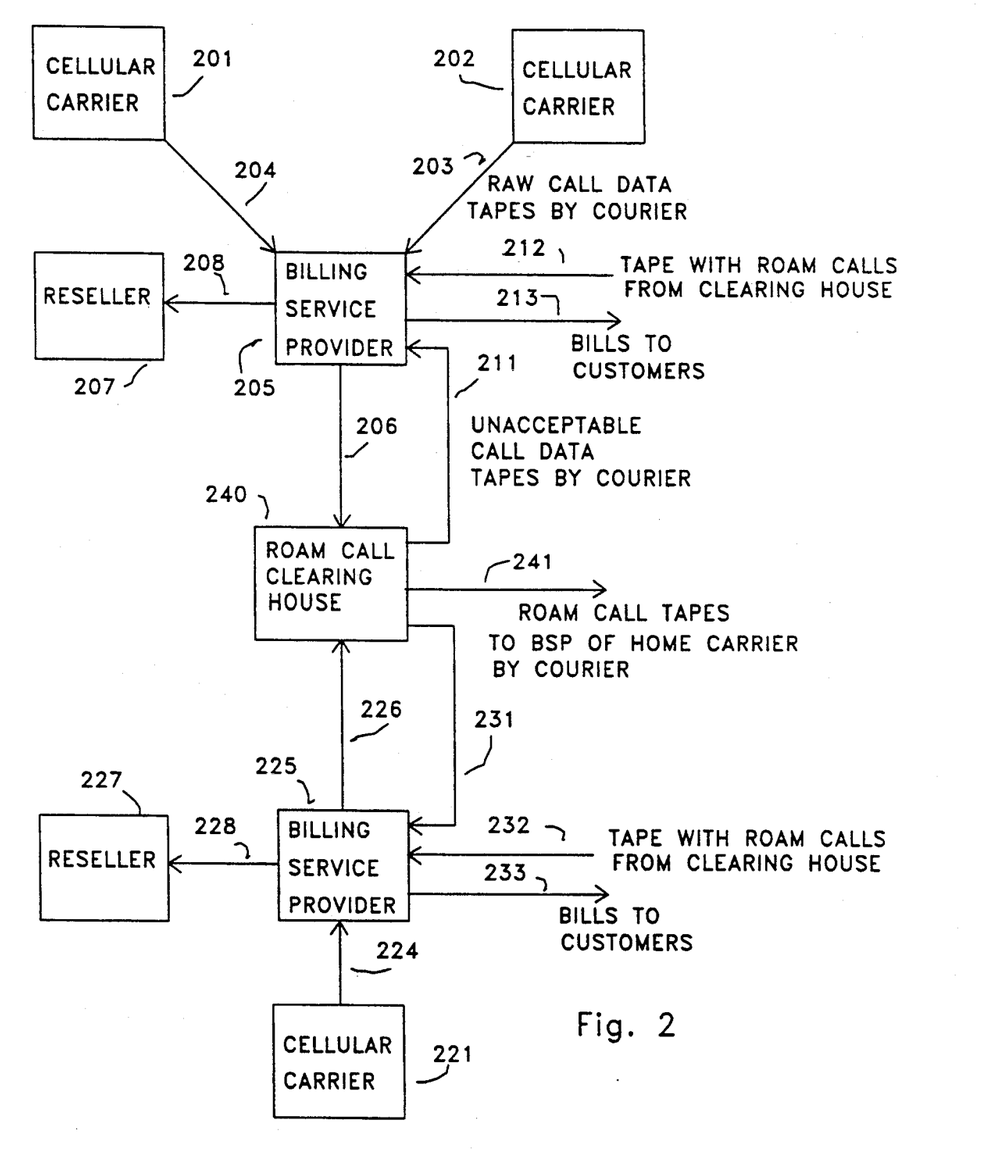
FIG. 2 illustrates the flow of billing data in cellular telephone systems.

FIG. 2 illustrates the flow of billing information in current cellular telephone systems. All paths shown in FIG. 2 are implemented by the physical transfer of tapes by courier.

In FIG. 2, billings for the cellular switches of carriers 201 and 202 are handled by a shared independent billing service provider 205. The paths 203, 204 represent physical transfer of raw call data record tapes from carriers 202 and 201 to billing service provider 205. Tapes are sent by courier at daily to weekly and even longer intervals. The billing service provider 205, provides monthly bills to the individual customers and to resellers 207 on a monthly basis. The bills to the individual customers cover air time used, 1+ long distance calls, roamer charges, and any service charges.

The billings to the resellers by tapes transported by courier, via path 208, cover reseller access charges; cellular airtime "rated" at the reseller's bulk rates for calls at various times of the day, 1+ long distance charges, roamer charges, and any service charges.

On a weekly or bi-weekly basis, the billing provider 205, by courier via path 206, transmits roam call detail tapes for calls processed by a client carrier to a roam clearing house 240. The roam call detail tapes contain complete detailed data which defines the cellular set engaged in the call, details about the call, details of the foreign carrier that provided service, rated air time and long distance charges, and tax information. At the present time there are at least two roam clearing houses in the United States.

The roam clearing house, examines the roam call detail records for proper format and age; sorts the roam call detail tape records by carrier, and weekly or bi-weekly transmits tapes by courier to the appropriate billing service providers. Any call records which are not in the industry standard format and any call records that are more than 30 days old are rejected and tapes with those records are returned to the appropriate billing service providers for resolution. The billing service providers, also, may dispute charges for certain roam call records; and return tapes with the disputed records to the foeign carrier or its agent. The clearing house, typically weekly or bi-weekly, transmits a call "exception" tape to the appropriate billing service providers for resolution.

The reasons for the long delays in billing and receiving payment for roam calls are evident from the above described manual preparation and transfer of roam call detail tapes.

The arrangements at the bottom of FIG. 2 illustrate an arrangement in which billing service provider 225 serves a single cellular carrier 221. All of the functions described with respect to billing service provider 205 which serves two cellular carriers apply equally to provider 225.

In summary, in accordance with present practice, cellular carrier billing processes which are characterized by physical transfer of call detail tapes by courier are complicated, slow, and expensive. Furthermore, delays in billing customer and receiving payment cause intolerable cash flow problems for carriers.

CALL ADMINISTRATION SYSTEM

Our call administration 103 of FIG. 1 comprises a plurality of dedicated processors 104, 105, 106, 108, 109, 110, 111, 112, and 113 which perform assigned system tasks; and a file server processor 107 which provides file service to the dedicated processors; and maintains the system software for all processors and the system data files in a large duplicated hard disk memory.

Central to our call administration system is file server processor 107. In the illustrative embodiment of our system, processor 107 is an IBM compatible 386 or 486 personal computer with a high capacity duplex external hard disk system. The duplex disk configuration provides redundancy for system reliability.

Operation of the file server processor 107 is based on a Novell SFT NetWare 286 or NetWare 386 operating system; and the file system which is managed by processor 107 is based on a Novell NetWare Btrieve record manager.

Three of the dedicated processors, namely, message module processor 105, customer interface module processor 109, and message rating module processor 113 are independent processors operating under DOS and are coupled to file server 107 by an ETHERNET circuit arrangent.

The remainder of the dedicated processors are coupled to the bus of processor 107 and are implemented by Cubix processor cards. Each Cubix card engages a free slot of file server processor 107; and each card provides two DOS based PC's, two RS232 serial ports; and two CRT ports.

Figure 4:
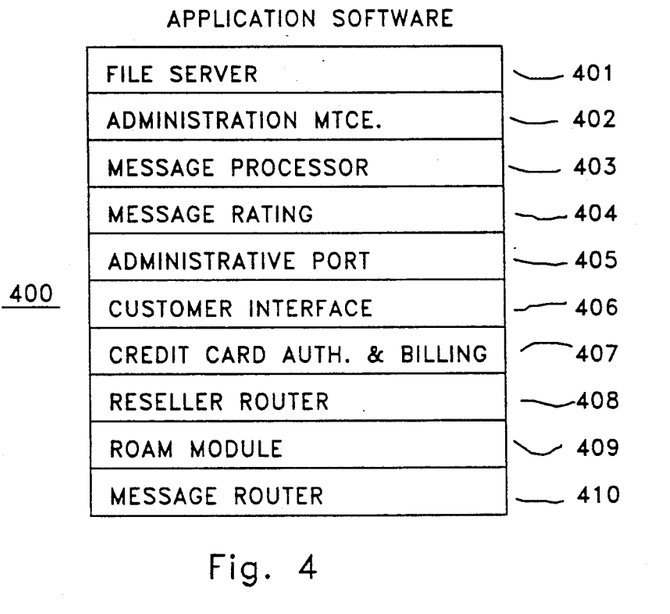
FIG. 4 provides an overview of application software employed in our system.
Figure 5:
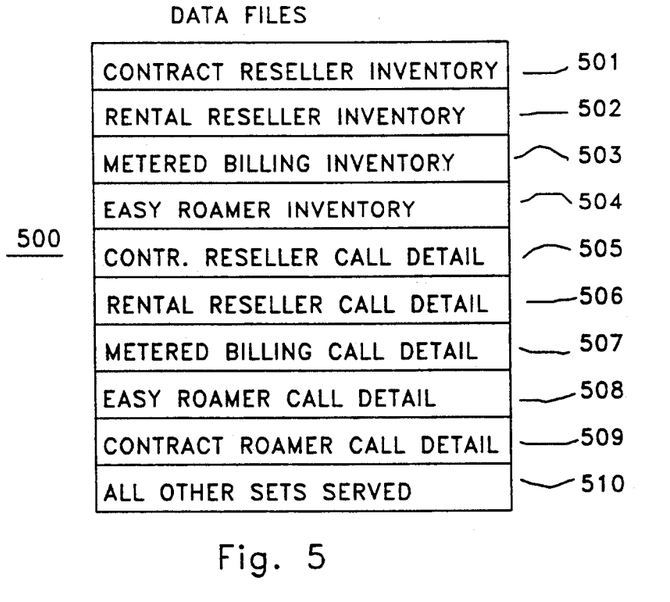
FIG. 5 provides an overview of major data files employed in our system.

FIGS. 4 and 5 illustrate the application software and data files which are stored in the hard disk of processor 107.

The features of our call administration system can best be understood by explanations of the interactions of the modules of our system with the cellular switch community.

Message module processor 105 is assigned the task of real time monitoring, classifying and storing of "raw call data" received from a synchronous serial Data Acquisition System port (DAS) of cellullar switch 100. Cellular switch 100, as a standard feature, on a real-time basis provides detailed "raw call data" about calls processed by the switch 100 on the DAS port which terminates on transmission path 118 of FIG. 1. In the illustrative embodiment, processor 105 is a 386 or 486 personal computer with an X.25 interface board to communicate with the DAS port which is a Serial x.25 communication link. Although only one DAS port is shown in FIG. 1, the illustrative Motorola switch provides two low speed serial DAS ports we employ for redundancy. The switch also provides one high speed DAS port. The call data on the DAS ports are transmitted as calls are processed by the switch.

The "raw call data" for each call provides full detailed information about each call processed by switch 100 as the call is processed. This is essentially the same data which is sent to tape storage 135 on operator demand.

For purposes of this discussion, it is assumed that inventories of the identities of the cellular sets which are served by certain service classes are stored in memory i.e., files 501, 502, 503, and 504 of FIG. 5. In the course of later discussions herein, it will be seen how cellular sets are added to and deleted from the inventories of the various service classes. It should be noted that cellular switch 100 has no information about the assignment of sets to the various service classes. The cellular switch only knows that a particular set is active for service by the switch; and the switch has a "terminating class of service word" which dictates how a call to a cellular set is handled under certain circumstances.

Service classes which are supported by our illustrative call administration system are:

Contract resellers: for service to sets not owned by the reseller;

Rental resellers for service to rental sets owned by the reseller;

Metered billing with established credit;

Easy Roam sets without a home carrier contract;

Roam sets served by contract with home carriers;

All other sets served by the cellular system.

As seen in FIG. 5, there is a call detail data file for each of these classes. On the basis of the inventories 501-504 of FIG. 5; and set identity information contained in the "raw" call data files, message module processor 105 classifies the raw data messages on path 118 into the appropriate classes; and passes the call record information into the corresponding call detail data files. As call records are processed by the message module 105, message rating module 113 is employed to selectively rate air time and long distance charges enumerated in the call records. In the cases of metered billing calls, contract roamer calls, and easy roamer calls, both air time and long distance charges are rated and stored in the respective call detail records.

In the cases of contract reseller calls and rental reseller calls, the reseller has the option receiving call detail records without charge rating. If this option is elected, the reseller has rating facilities to develop charges for both air time and long distance charges.

A major undertaking of our call administration system is the automatic electronic distribution of detailed call records to the appropriate billing facilities. In the illustrative embodiment of our system, detailed call records are sent to both contract and rental reseller facilities; to the roam set clearing house; and to the billing service providers.

Message router 111, roam router 110, and reseller router 108 are employed in the distribution of the call detail records to the various billing facilities.

Message router 111, periodically places a telephone call to the billing service provider for the local cellular switch for the purpose of downloading detailed call information from the "All other sets served" data files 510 of FIG. 5. Telephone calls are placed automatically via path 133 and the public switched network 134 of FIG. 1. The cellular carrier file server processor 107 facilitates the reading of records from the data files and the transfer of those records to the message router 111. Since archive copies of the records are maintained elsewhere, as the call records are transferred to the billing service provider and receipt is acknowledged, the records in data file 510 are purged to make room for current call records.

Roam router processor 110, like the message router module processor 111 serves to distribute the roam call records from the contract roamer data file 509 to the roam clearing house via an automatic dial-up telephone connection. The file server processor facilitates the reading of the call records from data file 509 and the transfer of those records to roam router processor 110. Again, as receipt of call records is confirmed by the clearing house, the transferred call records are purged from data file 509.

The box labeled reseller router module 108 is representative of a plurality of such facilities equal in number to the number of contract and rental resellers served by our call administration system. A reseller router module processor may communicate with the associated reseller via a telephone line 130 and the public switched network or by a dedicated or shared data link.

Figure 3:
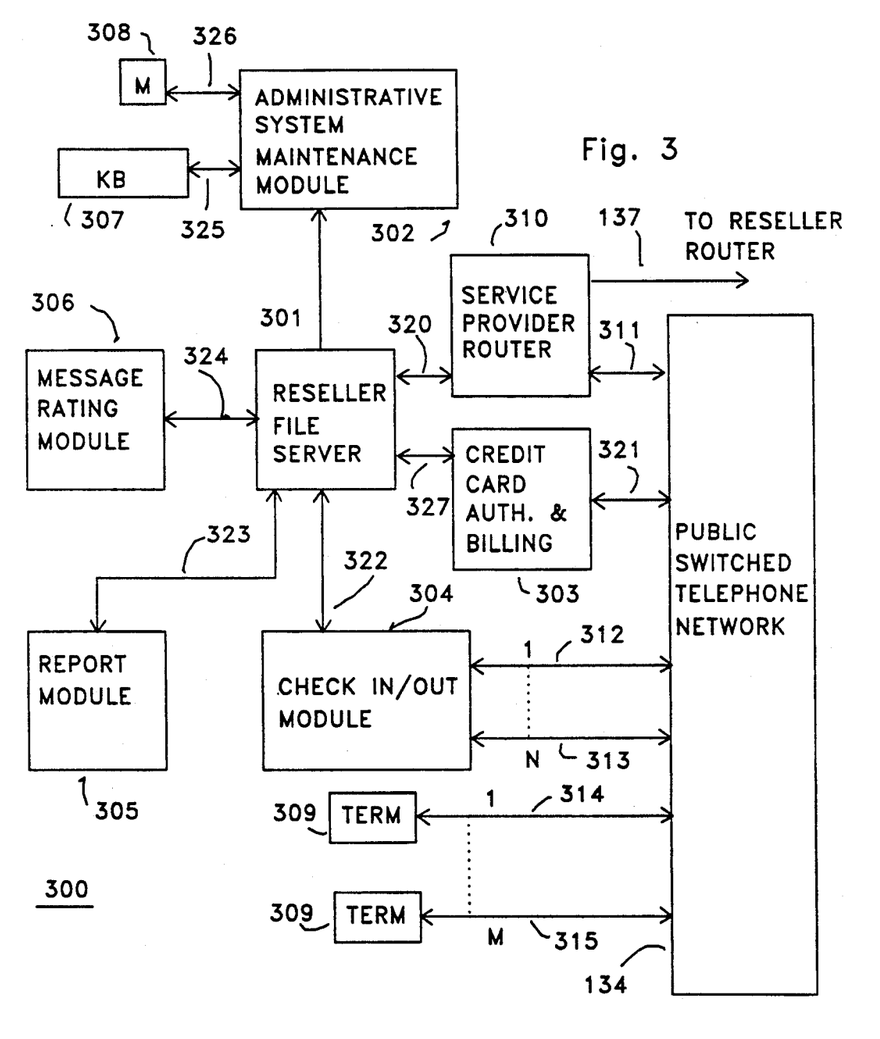
FIG. 3 is a block diagram of a check out/in reseller system.

A router reseller module processor 108 provides two functions. The processor 108 distributes call detail records to facilities of a reseller; and permits a reseller to activate and deactivate sets from its inventory for service by the cellular switch. In the case of a reseller with a dedicated or shared data line, processor 108 distributes call data records in near real time as they are received from the DAS system. Where the processor 108 is connected to a reseller facility by a telephone line and the public switched telephone network, the processor 108 places frequent telephone calls to the reseller to distribute call records. If the reseller facility e.g., at the time of check-in of a unit, has an immediate need for up-to-date detailed call records, the service provider router 310 automatically places a telephone call to its associated reseller router processor 108; and thus receives an immediate update of detailed call records.

A typical rental reseller facility is shown in FIG. 3. Reseller file server 301 is similar in structure and function to the cellular carrier file server 107 of FIG. 1.

Administrative system maintenance module 302, along with keyboard 307 and monitor 308, is a system maintenance facility for controlling system parameters, performing diagnostic tests and eliciting system reports.

Message rating module 306 is an optional feature of a reseller facility. A reseller has the option of receiving complete, partial, or no call rating from our call administration system. If partial call rating or no call rating is selected, message rating module 306 is provided at the reseller facility.

Credit card authorization and billing processor 303 provides a dial-up telephone connection to a credit card facility to verify a credit card, to obtain charge authorizations, and to submit billings to the facility.

Check In/Out module processor 304 serves a plurality of point-of-use terminals 309 by dial-up telephone connections through the public switched network 134. Such terminals may comprise: a credit card reader, a bar code reader, a keypad, and a printer. A typical, commercially available terminal, is a VERIFONE TRANZ terminal.

An operator at a terminal 309 may initiate a connection to its associated reseller router 108 in our call administration system 103. The path from a terminal 309 to the reseller router 108 comprises: a first switched telephone connection via e.g., line 314, PSTN 134, a line to a check in/out module 304 e.g., line 312; a check in/out module 304, service provider router 310 through the services of file server 301; a second dial-up telephone connection via line 311; PSTN 134; and line 137. In the event that the reseller facilities of FIG. 3 are connected to the reseller router by a dedicated line 130, the second telephone connection is omitted and the dedicated path is employed. Through the established path, up-to-date call data which is required to complete a transaction is provided; or a set may be activated or deactivated for service on the cellular switch 100. The communication protocol between a reseller facility of FIG. 3 and our call administration system is made secure by requirements for reseller identification numbers and secure passwords.

The following discussions illustrate significant features of new service classes that are implemented by our call administration system.

METERED BILLING SERVICE

At the time that a cellular set is assigned to Metered Billing service, credit to an amount selected by a customer is established for the set through a variety of billing arrangements and commercial agencies acting through customer interface module 109; and a set with approved credit is activated for use at the cellular switch by means of administrative port module processor 104. The calling activities of the sets of the metered billing class are continuously monitored by message module processor 105; air time and long distance charges are immediately calculated for each call by message rating module 113; and the charges for a call are charged against the established credit amount to arrive at a remaining credit balance. When the remaining credit balance for a set reaches a defined lower limit, the terminating class of service for the set is changed to divert the next call from that set to a customer interface module 109. The customer interface module presents a recorded voice announcement with instructions for interactively establishing further credit through the use of DTMF signals without the need for an operator. This transaction is conducted by voice instructions and acknowledgements from the customer interface module; and by DTMF signals from the cellular set. If new credit arrangements are not made and remaining credit is exhausted, the set is deactivated at the cellular switch and further service is denied until credit is again established. These arrangements permit companies and individuals to control their cellular telephone expenses to established limits.

Customer interface module 109 comprises an IBM compatible 286 or 386 personal computer with a Dialogic/40B voice communications board. A 40/B board supports four incoming telephone lines and each customer interface module 109 supports up to four boards. The incoming telephone lines for customer interface module 109 are assigned telephone numbers and they terminate on the public switched telephone network 134. The customer interface module is employed in the provision of both metered billing service and easy roam service. Since these services employ different voice messages and DTMF responses, the called telephone numbers serve to direct incoming calls to the proper voice messages.

EASY ROAMER SERVICE

As indicated earlier herein, is either denied service by a carrier that does not have a roam billing agreement with set's home carrier; or a roam set customer must visit the office of a foreign carrier and apply for temporary registration and secure payment for such service. This is a completely manual procedure which is time consuming and complex.

In accordance with our invention, if a call is attempted by a roam set through a cellular switch served by our call administration system, the switch connects the roam set to an appropriate customer interface module processor 109 via path 114, public switched network 134 and a line of path 131. As part of the transaction, the switch 100 conducts an automatic number identification of the roam set.

Customer interface module 109 presents voice messages which give the roam set customer the opportunity to automatically register the set for roam service for a selected period of time. The roam set customer interacts with interface module 109 by use of DTMF signals generated by the set's keypad. The registration process includes an indication of a credit card to secure payment for service. The customer interface module, with the assistance of file server 107, invokes the services of credit card authorization and billing module processor 112. A call to a credit card authority is placed from processor 112 through path 150 and the public switched telephone network 134. If the credit card is approved, the identity of the roam set is put in easy roamer inventory 504, the details of the credit arrangement are recorded, and the set is automatically activated for service through administrative port module processor 104. Call detail records for easy roamer sets are maintained in call detail data file 508 of FIG. 5. Since the registration is for a fixed period of time, the set is automatically removed from the easy roamer inventory at the expiration of the period.

The invention has been described with particular attention to its preferred embodiment; however, it should be understood that variations and modifications within the spirit and scope of the invention may occur to those skilled in the art to which the invention pertains.

What is claimed is:

1. A cellular telephone call administration system for a cellular telephone switching system which comprises: a switch for providing communication service to a plurality of cellular sets; means for generating and transmitting detailed call records of calls processed by the switch to a data output port; and an administrative port for receiving control signals for selectively activating and deactivating service to identified cellular sets; CHARACTERIZED IN THAT:

the call administration system comprises:
memory means comprising a plurality of service class data files assigned respectively to corresponding system service classes;
means coupled to said data output port for assigning detailed call records appearing at said data output port into a plurality of system service classes; and for storing records corresponding to each of said detailed call records in the data file of the service class assigned to the call record;
means for automatically distributing the contents of said service class data files; and
means for automatically generating said control signals for selectively activating and deactivating cellular sets for service by said cellular switch.

2. A cellular telephone call administration system in accordance with claim 1 CHARACTERIZED IN THAT: said call administration system further comprises means for rating detailed call records of selected service classes as the records are received from said data output port, and means for including call rating charge data in the records stored in the data files of said selected service classes.

3. A cellular telephone administration system in accordance with claim 1

CHARACTERIZED IN THAT:

certain of said system service classes each comprise a plurality of divisions;

said means coupled to said data output port assigns call records of said certain service classes to said divisions of said classes; and said records stored in said certain service class data files are assigned said divisions.

* * * * *

UNITED STATES PATENT AND TRADEMARK OFFICE
CERTIFICATE OF CORRECTION

PATENT NO : 5,148,472
DATED : Sep. 15, 1992
INVENTOR(S) : David E. Freese, David A. Miller, Mark J. Nielsen It is certified that error appears in the above-identified patent and that said Letters Patent is hereby corrected as shown below:

On Title Page item [73]: should read

Assignee: Subscriber Computing, Incorporated, 5 Oldfield, Suite 200, Irvine, CA 92718, A corp. of CA.

Signed and Sealed this

Ninth Day of March, 1993

*Attest:*

STEPHEN G. KUNIN

*Attesting Officer*     *Acting Commissioner of Patents and Trademarks*